United States Patent
Cerovic et al.

(10) Patent No.: US 11,411,680 B2
(45) Date of Patent: Aug. 9, 2022

(54) OMAMRC TRANSMISSION METHOD AND SYSTEM WITH REDUCED SIGNALLING

(71) Applicant: ORANGE, Issy-les-Moulineaux (FR)

(72) Inventors: Stefan Cerovic, Chatillon (FR); Raphael Visoz, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 79 days.

(21) Appl. No.: 17/040,262

(22) PCT Filed: Mar. 25, 2019

(86) PCT No.: PCT/FR2019/050670
§ 371 (c)(1),
(2) Date: Sep. 22, 2020

(87) PCT Pub. No.: WO2019/180395
PCT Pub. Date: Sep. 26, 2019

(65) Prior Publication Data
US 2021/0021375 A1 Jan. 21, 2021

(30) Foreign Application Priority Data
Mar. 23, 2018 (FR) ..................................... 1852543

(51) Int. Cl.
*H04L 1/00* (2006.01)
*H04L 5/14* (2006.01)
*H04W 72/04* (2009.01)

(52) U.S. Cl.
CPC .............. *H04L 1/0076* (2013.01); *H04L 5/14* (2013.01); *H04W 72/0446* (2013.01); *H04L 2001/0097* (2013.01)

(58) Field of Classification Search
CPC . H04L 1/0076; H04L 5/14; H04L 5/16; H04L 2001/0097; H04W 72/0446; H04W 84/18
See application file for complete search history.

(56) References Cited

U.S. PATENT DOCUMENTS

| | | | |
|---|---|---|---|
| 9,258,352 B2 | 2/2016 | Khalife et al. | |
| 2008/0309986 A1* | 12/2008 | Coffee | H04N 1/00217 358/407 |
| 2018/0367254 A1 | 12/2018 | Abdulaziz et al. | |

FOREIGN PATENT DOCUMENTS

| | | |
|---|---|---|
| EP | 2672751 A1 | 12/2013 |
| WO | 20170198188 A1 | 6/2017 |

OTHER PUBLICATIONS

English translation of the Written Opinion of the International Searching Authority dated Sep. 29, 2020 for corresponding International Application No. PCT/FR2019/050670, filed Mar. 25, 2019.

(Continued)

*Primary Examiner* — Jamal Javaid
(74) *Attorney, Agent, or Firm* — David D. Brush; Westman, Champlin & Koehler, P.A.

(57) ABSTRACT

A method for transmitting successive messages forming a frame, implemented by a telecommunications system with M sources $(S_1, \ldots, S_M)$, possibly L relays $(R_1, \ldots, R_L)$ and a destination, $M \geq 2$, $L \geq 0$. The method implements a HARQ mechanism and includes: transmitting, from the destination to the nodes $(R_1, R_2, \ldots, R_{L+M})$, a control message indicating its set $(S_{D,t-1})$ of correctly decoded source messages; determining, by each node $(R_1, R_2, \ldots, R_{L+M})$, whether at least one message from its set of correctly decoded source messages does not belong to the set of source messages correctly decoded by the destination; and transmitting a binary indicator by a node $(R_1, R_2, \ldots, R_{L+M})$ to the destination indicating the result of the determination.

11 Claims, 1 Drawing Sheet

(56) References Cited

OTHER PUBLICATIONS

International Search Report dated Jun. 12, 2019 for corresponding International Application No. PCT/FR2019/050670, filed Mar. 25, 2019.
Written Opinion of the International Searching Authority dated Jun. 12, 2019 for corresponding International Application No. PCT/FR2019/050670, filed Mar. 25, 2019.
Mohamad et al., "Cooperative Incremental Redundancy Hybrid Automatic Repeat Request Strategies for Multi-Source Multi-Relay Wireless Networks", dated Sep. 9, 2016.

\* cited by examiner

OMAMRC TRANSMISSION METHOD AND SYSTEM WITH REDUCED SIGNALLING

CROSS-REFERENCE TO RELATED APPLICATIONS

This Application is a Section 371 National Stage Application of International Application No. PCT/FR2019/050670, filed Mar. 25, 2019, the content of which is incorporated herein by reference in its entirety, and published as WO 2019/180395 on Sep. 26, 2019, not in English.

FIELD OF THE DISCLOSURE

The present invention relates to the field of digital communications. Within this field, the invention relates more particularly to the transmission of coded data between at least two sources and a destination with relaying by at least one node that may be either a relay or a source.

It is understood that a relay does not have its own message to transmit. A relay is a node dedicated to relaying messages from sources, whereas a source has its own message to transmit and may also in some cases relay messages from other sources. A transmission from a relay is called a cooperative transmission. A transmission from a source that assists at least one other source is also called a cooperative transmission. A source is a relaying node and thus performs a relaying function if it listens to transmissions from other nodes and, on this basis, attempts to decode messages from the other sources.

There are numerous relaying techniques known by their English name: "amplify and forward", "decode and forward", "compress-and-forward", "non-orthogonal amplify and forward", "dynamic decode and forward", etc.

BACKGROUND OF THE DISCLOSURE

Reference [1] describes a transmission technique with relaying implemented in a system with M sources, $\mathcal{S} = \{S_1, \ldots, S_M\}$, L relays, $\mathcal{R} = \{R_1, \ldots, R_L\}$ and a destination D illustrated in FIG. 1. The nodes (sources and relays) access the transmission channel according to an orthogonal time-division multiple access scheme (use of one and the same radio resource). The transmissions of the messages from the sources are divided into frames during which the state (CSI, Channel State Information) of the links is assumed to be constant (slow fading scenario). The transmission of a frame takes place in two phases as illustrated in FIG. 2. The exchanges of messages and of signaling signals are illustrated in FIG. 3.

During the first phase, the sources each transmit their message in turn respectively during time slots each dedicated to a source. Each message from a source represents K bits of information that include parity bits, known as CRCs, denoted $u_{S_i}$, $u_{S_i} \in \mathbb{F}_2^K$, $i \in \{1, \ldots, M\}$. The transmitted modulated symbols $x_{S_i}$ have lengths $N_1$ and the sources are assumed to be statistically independent ($\mathbb{F}_2$ being the two-element Galois field). Each time slot has a duration of $N_1$ channel uses. For each message corresponding to a source, a message is detected as being correctly decoded by testing the parity bits or CRCs. A message is assimilated to the corresponding source for the purposes of notation. This phase lasts M time slots.

During the second phase, the sources and the relays access the transmission channel to the destination according to an orthogonal time-division multiple access scheme that allows the relays to listen without interference to transmissions from the other relays and the sources. This phase comprises at most $T_{max}$ time slots (rounds), $T_{max} \geq 1$. Each slot (round) $t \in \{1, \ldots, T_{max}\}$ has a duration of $N_2$ channel uses. In FIG. 2, the notation R indicates that this is a retransmission occurring during the second phase.

The destination D decides on the number of time slots during the second phase and on the source or the relay that transmits in each slot during this phase in order to correctly decode a maximum number of messages from the sources by implementing a hybrid automatic repeat mechanism HARQ.

To this end, at the start of each slot (round) t, the destination broadcasts, via a broadcast control channel, a common positive acknowledgement (common ACK) to all of the sources and all of the relays if it has correctly decoded the messages from all of the sources at the end of the slot (round) t−1. In all other cases, the destination broadcasts a common negative acknowledgement (common NACK).

If the destination has transmitted a common negative acknowledgement then, at the start of each slot (round) t, a control signal is transmitted by each of the relays using a point-to-point (unicast) control channel. This control signal identifies the set $S_{r,t-1} \subseteq \{S_1, \ldots, S_M\}$, $1 \leq t \leq T_{max}$, of messages (or sources) correctly decoded by this relay at the end of the previous slot.

Taking into account the sets received, its own set of correctly decoded messages, the CSI (Channel State Information) of the source links to the destination and relays to the destination, the previously selected nodes and their sets, the destination selects the node $\hat{a}_t$ authorized to transmit in the slot t by broadcasting a control signal containing the information from the selected relay via a broadcast control channel.

Although the cooperation strategy according to [1] is such that the sources and the relays cooperate in order to maximize the sum of the bitrates transmitted between the sources and the destination, it requires a certain signaling signal load.

SUMMARY

One subject of the present invention is a method for transmitting successive messages forming a frame intended to be implemented by a telecommunications system with M sources, possibly L relays and a destination, $M \geq 2$, $L \geq 0$ according to an orthogonal multiple access scheme of the transmission channel between the nodes taken from among the M sources and the L relays with a maximum number of $M+T_{max}$ time slots per transmitted frame including M slots allocated, during a first phase, to the successive transmission of the M sources, and at most $T_{max}$ slots for one or more cooperative transmissions allocated, during a second phase, to one or more nodes selected according to a selection strategy, $1 \leq T_{max}$, the nodes operating in half-duplex mode. The method comprises:

decoding, by at least one node, of messages transmitted by the sources with detection of errors on the messages in order to determine a set of source messages correctly decoded by this node, decoding, by the destination, of messages from a node with detection of errors on the messages in order to determine a set of source messages correctly decoded by the destination and, for a time slot t of the second phase, the method furthermore comprises:

transmission, from the destination to the nodes, of a control message indicating its set of correctly decoded source messages, determination, by at least one node, whether at least one message from its set of correctly decoded source messages does not belong to the set of source messages correctly decoded by the destination, transmission of binary information by at least one node to the destination indicating the result of the determination, selection, by the destination, of one of the nodes authorized to transmit during the transmission slot t.

The OMAMRC transmission system under consideration comprises at least two sources and possibly one or more relays, each of these sources being able to operate at different times either as a source or as a relay. A source may be any equipment that has a message to transmit and that has encoding and decoding means. Relaying node terminology covers both a relay and a source acting as a relay. The system under consideration is thus such that the sources may themselves be relays. A relay differs from a source if it has no message to transmit that is specific thereto, that is to say it retransmits only messages from other nodes. A relaying node that is a source always has its own message in its set of sources decoded without an error. A source that is not a relaying node always has its message set considered to be decoded without an error that is identical to its own message. The destination knows in advance the nature of the nodes and therefore knows in advance what message a source that is a node but is not a relaying node is able to transmit.

The destination may be a base station or any other equipment addressed by a plurality of sources.

The links between the various nodes (sources, relays and destination) of the system are subject to slow fading and to white Gaussian noise. A limited control channel is authorized from the destination to the sources and to the relays.

A limited broadcast control channel is present from the destination to the sources and the relays in order to inform the sources and the relays of error-free decoding of all of the sources at the destination.

The retransmission from a node, source or relay, is requested explicitly by a signal associated with another broadcast control channel from the destination to the sources and the relays. This results in the transmission of redundancy by the selected node based on incremental coding of the sources that said node has been able to decode without an error (its own message for a source that is not a relaying node). There are furthermore point-to-point ("unicast") control channels so that each relaying node informs the destination of the messages received and correctly decoded.

In the first phase, the M sources successively transmit their message during the M time slots. In the $2^{nd}$ phase, the messages from the sources are transmitted cooperatively by the nodes (sources and possibly relays) for at most $T_{max}$ time slots.

During the first phase, the mutually independent sources broadcast their coded information sequences in the form of messages for the attention of a single recipient. The destination, the relays and the sources other than the one that transmits, of "Half Duplex" type (HD, (that is to say that a source or a relay cannot receive and transmit simultaneously)) receive the successive messages from the sources, decode them and determine their set of source messages decoded without an error.

The destination broadcasts its set of source messages decoded without an error to the nodes.

Each node (relays and sources) compares its own set to the destination set. If its own set is not included in the destination set, that is to say that it has at least correctly decoded a message that the destination has not decoded correctly, then it transmits an indicator to the destination.

Upon receiving the indicators from the nodes, the destination immediately identifies those from the nodes that are able to assist it with its decoding.

The destination then selects a node from among the nodes that are able to assist it.

The selected node then transmits, during the time slot, a message representative of the at least one message that it has correctly decoded and that is not contained in the destination set.

Thus, using the exchanges typically via a control channel, the destination informs the nodes of its set of correctly decoded messages. A node is thus able to determine whether it is able to assist the destination by comparing this destination set with its own set. When it has correctly decoded a message that the destination has not yet decoded correctly, it is able to assist it and, if it is a relaying node, it then sends an indicator thereto informing it thereof. This indicator may be limited to one bit.

In spite of the exchanges of very limited control information, the destination has knowledge of the nodes that it is able to call upon in the current transmission slot (time slot) in order to assist it with its decoding of messages that have not yet been correctly decoded. It should be noted that a source that is not a relaying node (that is to say that does not perform a function of relaying a message from another source) always has its message set considered to be decoded without an error since it is identical to its own message. The destination knows in advance the set from a source that is not a relaying node due to its nature and therefore does not need to receive an indicator from this type of node in order possibly to call upon it to assist it with its decoding. The destination selects one of the nodes, whether or not this is a relaying node, in order to authorize it to transmit, taking into account the received binary information.

Thus, the cooperation strategy according to the invention is such that the sources and the possible relays cooperate with the destination in order to maximize the decoding of the destination with a less expensive signaling load than according to known techniques.

Specifically, the transmission of control signals via unicast channels is limited to the transmission of an indicator from the nodes to the destination. This indicator may be limited to one transmitted bit.

Such a method is particularly suitable for a system deployed in an urban environment in which the transmission channel generally has what is called a Rayleigh fading profile. Specifically, such fading interferes with the transmitted signal and results in a non-zero probability of erroneous detection (what is called outage probability).

According to one embodiment, the binary information is conveyed by the transmission of a binary indicator taking the value one when the determination by the node leads to the identification of at least one message, and otherwise taking the value zero.

According to one embodiment, the binary information is conveyed by the transmission of a signal that takes place only if the determination by the node leads to the identification of at least one message.

According to one embodiment, if the set of source messages correctly decoded by the destination indicated in the control message comprises all of the sources or if $t=T_{max}$, then the second phase is interrupted, the nodes and the destination erase any storage of the messages of the frame and a new frame is transmitted. Thus, when $t=T_{max}$, the method is interrupted after the decoding, by the destination, of the information received following the transmission from the selected node since there is no longer a slot able to be allocated for the transmission of the current frame.

According to one embodiment, the node selection strategy corresponds, at each slot, to the selection of the node from among the nodes said to be eligible nodes that have correctly decoded at least one source that the destination has not correctly decoded at the end of the previous time slot and that has the best instantaneous quality from among the instantaneous qualities of the links between these eligible nodes and the destination.

According to one embodiment, a node that performs a relaying function implements what is known as JNCC relaying.

According to one embodiment, a node that performs a relaying function implements what is known as DCC relaying.

According to one embodiment, a node that performs a relaying function implements what is known as repetition relaying with what is known as MRC combination at the destination.

Another subject of the invention is a system comprising M half-duplex sources, possibly L half-duplex relays and a destination, M>1, L≥0, for implementing a transmission method according to a preceding subject.

Another subject of the invention is each of the specific software applications on an information medium, said applications comprising program instructions designed to implement the transmission method when these applications are executed by processors respectively of a source, of a destination and possibly of a relay.

Another subject of the invention is configured memories containing instruction codes corresponding respectively to each of the specific applications.

The memory may be incorporated into any entity or device capable of storing the program. The memory may be of ROM type, for example a CD-ROM or a microelectronic circuit ROM, or else of magnetic type, for example a USB key or a hard disk.

On the other hand, each specific application according to the invention may be downloaded from a server accessible on an Internet network.

The optional features presented above in the context of the transmission method may possibly apply to the software application(s) and to the memory (memories) that are mentioned above.

The invention applies in particular, but not exclusively, to the transmission of data via mobile networks, for example for real-time applications, or via for example sensor networks. The network is a multi-user network, consisting of a plurality of sources, possibly a plurality of relays and a recipient using an orthogonal multiple access scheme of the transmission channel between the sources, the relays and the destination, denoted OMAMRC ("Orthogonal Multiple-Access Multiple-Relay Channel"). The system implements what is known as an IR-HARQ (Incremental Redundancy Hybrid-ARQ) cooperation strategy based on what is known as SDF (Selective Decode and Forward) selective relaying.

In this type of cooperation, the mutually independent sources broadcast their coded information sequences in the form of messages for the attention of a single recipient and possibly in the presence of relays. The relaying nodes of "Half Duplex" type (HD, (that is to say a relaying node is not able to receive and transmit simultaneously)) receive messages from the sources, decode them and generate a message solely from messages from the sources that are decoded without an error. The nodes (including sources and relays) then access the channel orthogonally in time with one another in order to transmit their message to the destination. The selectivity of the relaying nodes means that a relaying node transmits a signal only if it decodes at least one source without an error.

The links between the various nodes of the system are subject to slow fading and to white Gaussian noise. A limited control channel is authorized from the destination to the sources and to the relays. The CSI state of each of the links is not available at the destination in order to limit the excess cost of the return channels from the sources and the relays to the destination conveying information about the distribution of the channels (CDI: Channel Distribution Information) of all of the links, for example, the SNR averages of all of the links This information is needed at the destination in order to determine the bitrates allocated to the sources (what is known as slow link adaptation).

BRIEF DESCRIPTION OF THE DRAWINGS

Other features and advantages of the invention will become more clearly apparent upon reading the following description of embodiments, given by way of simple illustrative and non-limiting examples, and the appended drawings, in which.

DETAILED DESCRIPTION OF ILLUSTRATIVE EMBODIMENTS

The following description of one embodiment of the invention is illustrated with implementation by an OMAMRC system with M=3 sources, L=3 relays and a destination. It is moreover assumed that each source is a relaying node, that is to say that each source attempts to decode the message from the other sources on the basis of the transmissions from the relays and the other sources.

Figure 1:
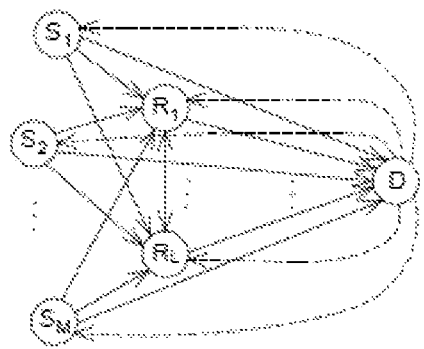
FIG. 1 is a diagram of what is known as an OMAMRC (Orthogonal Multiple Access Multiple Relays Channel) system.
Figure 2:
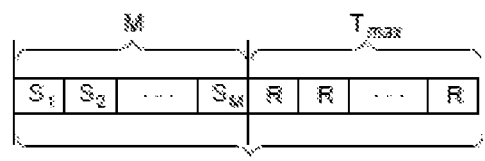
FIG. 2 is a diagram of a frame transmission cycle.
Figure 3:
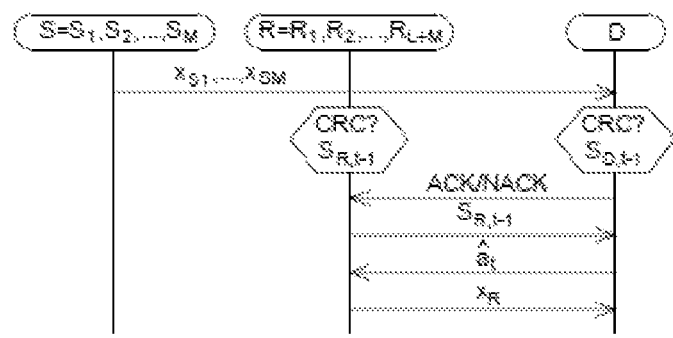
FIG. 3 is a diagram of the signaling implemented by the method according to the prior art.

The method 1 comprises a first phase and a second phase that are illustrated in FIG. 2. The first phase comprises the M=3 time slots during which the M sources $S=S_1, S_2, \ldots, S_M$ respectively transmit 2 their messages $x_{S_1}, \ldots, x_{S_M}$. The second phase comprises $T_{max}=4$ time slots (retransmission rounds). The destination D and the relaying nodes $R=R_1, R_2, \ldots, R_{L+M}$ (relays and sources) receive the transmitted messages, decode them and determine which messages are correctly decoded by testing the CRC. Each of these equipments thus determines its set $S_{D,t-1}$, $S_{R,t-1}$ of correctly decoded messages.

Figure 4:
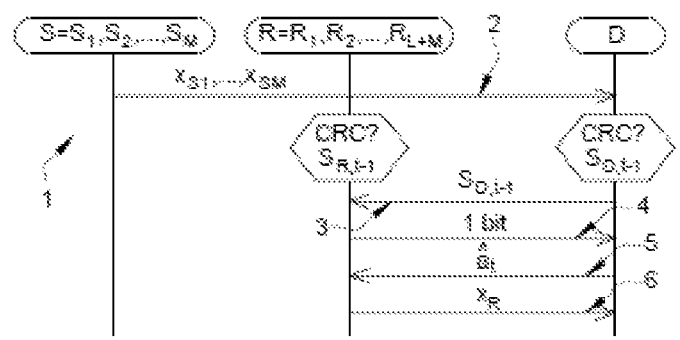
FIG. 4 is a diagram of the signaling implemented by the method according to the invention.

At the start of each what is known as current time slot t of the second phase, the exchange of control information in order to implement the HARQ mechanism illustrated in FIG. 4 is as follows.

The destination broadcasts 3, via a broadcast control channel, M bits indicating its set $S_{D,t-1}$ of messages decoded correctly at the end of the previous time slot, t−1.

If this set $S_{D,t-1}$ comprises the messages from all of the sources, then the second phase is interrupted, the nodes and the destination empty their memory buffer, that is to say erase any storage of the messages of the current frame and of their decoding, and a new frame is transmitted.

Otherwise, each listening relaying node (relay and cooperative source) that has correctly decoded at least one message $S_{R,t-1} \neq \emptyset$ that does not belong to the destination set $S_{D,t-1}$, $S_{R,t-1} \not\subset S_{D,t-1}$, sends 4 binary information, for example a non-zero signal representing the value one of a binary processor indicator (the lack of reception of a signal therefore represents the value zero of this binary indicator). The value one of this indicator is sent via a point-to-point (unicast) control channel to the destination. The relaying nodes that have not correctly decoded at least one message that does not belong to the destination set remain silent, and they do not transmit anything. It should be noted that a source that performs a relaying function and is therefore called a relaying node in this particular description does not need to transmit a non-zero signal if its set $S_{R,t-1}$ is limited to its own message. Specifically, the destination, due to the nature of this relaying node, knows in advance that this node is able to assist it for the source's own message.

The destination is thus easily able to determine, on the basis of the received indicators, which relaying nodes are able to assist it. The destination selects one of the relaying nodes and broadcasts 5 its decision to the relaying nodes via a broadcast control channel.

The selected relaying node then transmits 6 information representative of its set of correctly decoded messages.

The relaying node may jointly encode the correctly decoded messages and send incremental redundancy bits representative of all of the correctly decoded messages. This strategy will be referred to as joint network channel coding (JNCC). Other techniques may also be used, such as distributed channel coding (DCC), in which for example the relaying node may randomly choose a single source, which the destination has not yet decoded, for which it sends incremental redundancy bits if it is selected. According to one simple embodiment, the relaying node may repeat one of the messages from among the correctly decoded messages (transmit exactly the same signal as the one transmitted initially by the associated source). In the latter case, the destination uses what is known as a maximal-ratio combining (MRC) technique on the received signals corresponding to the same source.

According to one embodiment, a source that is not a relaying node applies, after having been selected by the destination, one of the same strategies (as those applied by the relaying nodes and described above) but limited to the case where the set of correctly decoded messages consists of a single message that is its own message.

The proposed method reduces the signaling load in comparison with the mechanism known from [1]. In order to establish the comparison, it is assumed that the destination successfully decodes all of the messages from the sources at the end of the $T_{max}$ time slots, that is to say it needed $T_{max}$ retransmissions in order to achieve this success.

In order to implement the HARQ mechanism according to the invention, the aggregated amount of signaling transmitted on the unicast control channels from the sources and the relays to the destination at the end of the $T_{max}=4$ time slots is less than or equal to $T_{max} \times (M+L)=24$ bits. Equality (amount=$T_{max} \times (M+L)$) occurs in the worst-case scenario in which none of the nodes remain silent during the $T_{max}=4$ time slots.

Specifically, at the start of a current time slot t of the second phase, t=1, ..., $T_{max}$, each node R=$R_1$, $R_2$, ..., $R_{L+M}$ remains silent or transmits an indicator (1 bit) in order to notify the destination that it has correctly decoded at least one message that does not belong to the destination set. A node therefore remains silent only if it is a source that does not perform a relaying function or if it has not correctly decoded at least one message that does not belong to the destination set, that is to say either it has not correctly decoded any message or, if it has correctly decoded one or more messages, then these messages all belong to the destination set.

The aggregated amount of signaling transmitted on the broadcast control channel from the destination to the sources and the relays at the end of the $T_{max}=4$ time slots is equal to $T_{max} \times (\lceil \log_2(M+L) \rceil + M)=24$ bits, where $\lceil \log_2(M+L) \rceil$ bits is the number of bits needed to provide information about the decision by the destination on the selected node authorized to transmit (scheduled node) $\hat{a}_r$ and M is the number of bits needed to provide information about the correctly decoded destination set. That is to say a total of 24+24=48 bits.

In order to implement the HARQ mechanism according to the mechanism known from [1], the aggregated amount of signaling transmitted on the unicast control channels from the sources and the relays to the destination at the end of the $T_{max}=4$ time slots is equal to $T_{max} \times (M+L) \times M=72$ bits. Specifically, the M+L nodes transmit their set of correctly decoded messages (M bits to indicate which source is correctly decoded) at the start of each time slot of the second phase. The aggregated amount of signaling transmitted on the broadcast control channel from the destination to the sources and the relays at the end of the $T_{max}=4$ time slots is equal to $T_{max} \times (\lceil \log_2(M+L) \rceil + 1)=16$ bits, where $\lceil \log_2(M+L) \rceil$ bits is the number of bits needed to provide information about the decision by the destination on the selected node authorized to transmit (scheduled node) $\hat{a}_r$ and 1 bit in each time slot to transmit a common positive acknowledgement/negative acknowledgement ACK/NACK. That is to say a total of 72+16=88 bits.

The comparison may differ between unicast channels and broadcast channels.

With regard to the unicast control channels between the nodes and the destination, the aggregated amount of signaling transmitted is at least M times less for the method according to the invention. This is advantageous since these channels are the most expensive. According to the example, the reduction is $T_{max} \times (M+L) \times M - T_{max} \times (M+L) = T_{max} \times (M+L)(M-1) = 72-24=48$ bits.

According to the method according to the invention, the aggregated amount of signaling transmitted may be limited to zero in the best-case scenario.

With regard to the broadcast control channel from the destination to the nodes, the aggregated amount of signaling transmitted according to the method according to the invention increases by $T_{max} \times (\lceil \log_2(M+L) \rceil + M) - T_{max} \times (\lceil \log_2(M+L) \rceil + 1) = T_{max} \times (M-1)=8$ bits, which is an acceptable compromise.

REFERENCES

[1] A. Mohamad, R. Visoz and A. O. Berthet, "Cooperative Incremental Redundancy Hybrid Automatic Repeat Request Strategies for Multi-Source Multi-Relay Wireless Networks," IEEE Commun. Lett., vol. 20, no. 9, pp. 1808-1811, September 2016.

Although the present disclosure has been described with reference to one or more examples, workers skilled in the art will recognize that changes may be made in form and detail without departing from the scope of the disclosure and/or the appended claims.

The invention claimed is:

1. A transmission method comprising:
transmitting successive messages forming a frame by a telecommunications system with M sources ($S_1, \ldots, S_M$), and a destination, M≥2, according to an orthogonal multiple access scheme of a transmission channel between nodes taken from among the M sources with a maximum number of $M+T_{max}$ time slots per transmitted frame including M slots allocated, during a first phase, to the successive transmission by the M sources, and at most $T_{max}$ slots for one or more cooperative transmissions allocated, during a second phase, to one or more of the nodes selected according to a selection strategy, $1 \leq T_{max}$, the nodes operating in half-duplex mode, wherein the transmitting comprises:
decoding, by at least one of the nodes ($S_1, \ldots, S_M$), messages transmitted by the sources with detection of errors on the messages in order to determine a set of source messages correctly decoded by the at least one node, all the nodes which correctly decode source messages being called first nodes;
decoding, by the destination, messages from at least one second node ($S_1, \ldots, S_M$) of the nodes, with detection of errors on the messages in order to determine a set of source messages correctly decoded by the destination; and
for a time slot t of the second phase:
transmission, from the destination (D) to the nodes ($S_1, \ldots, S_M$), of a control message indicating its set ($S_{D,t-1}$) of correctly decoded source messages,
determination, by at least one third node ($S_1, \ldots, S_M$), of the first nodes, whether at least one message from the set of correctly decoded source messages by the at least one third node does not belong to the set of source messages correctly decoded by the destination,
transmission of binary information by the at least one third node ($S_1, \ldots, S_M$) to the destination (D) indicating a result of the determination, the binary information being conveyed by transmitting a binary indicator taking a first value when the determination by the at least one third node leads to the identification of at least one message, and otherwise taking a second, different value,
selection, by the destination (D), of one of the at least one third node of the first nodes ($S_1, \ldots, S_M$) authorized to transmit during the transmission slot t.

2. The transmission method as claimed in claim 1, wherein, in response to the set ($S_{D,t-1}$) of source messages correctly decoded by the destination indicated in the control message comprising all of the sources or if $t=T_{max}$, interrupting the second phase, and the nodes and the destination erasing any storage of the messages of the frame and a new frame is transmitted.

3. The transmission method as claimed in claim 1, wherein the node selection strategy corresponds, at each slot, to selection of the node from among the nodes said to be eligible nodes that have correctly decoded at least one source that the destination has not correctly decoded at the end of the previous time slot and that has a best instantaneous quality from among instantaneous qualities of links between these eligible nodes and the destination.

4. A system comprising:
M sources ($S_1, \ldots, S_M$), and a destination (D), M≥2, with an orthogonal multiple access scheme of a transmission channel between nodes taken from among the M sources with a maximum number of $M+T_{max}$, $T_{max} \geq 1$, time slots per transmitted frame including M slots allocated, during a first phase, to the successive transmission by the M sources, and at most $T_{max}$ slots for one or more cooperative transmissions allocated, during a second phase, to one or more of the nodes selected according to a selection strategy,
wherein each of the nodes comprises:
a processor; and
a non-transitory computer-readable medium comprising instructions stored thereon which when executed by the processor configure the node to:
operate in half-duplex mode;
decode messages transmitted by the sources with detection of errors on the messages in order to determine a set of source messages correctly decoded by the node; and
for a time slot t of the second phase:
determine whether at least one message from the node's set of correctly decoded source messages does not belong to a set of source messages correctly decoded by the destination,
transmit binary information to the destination indicating a result of the determination, the binary information being conveyed by transmitting a binary indicator taking a first value when the determination by the node leads to the identification of at least one message, and otherwise taking a second, different value; and
wherein the destination comprises:
a processor; and
a non-transitory computer-readable medium comprising instructions stored thereon which when executed by the processor of the destination configure the destination to:
decode messages from a node ($S_1, \ldots, S_M$), among the nodes, with detection of errors on the messages in order to determine the set of source messages correctly decoded by the destination;
transmit to the nodes ($S_1, \ldots, S_M$) the control message indicating the destination's set ($S_{D,t-1}$) of correctly decoded source messages, and
select one of the nodes ($S_1, \ldots, S_M$) authorized to transmit during the transmission slot t.

5. A transmission method comprising:
transmitting successive messages forming a frame by a telecommunications system with M sources ($S_1, \ldots, S_M$), L relays ($R_1, \ldots, R_L$) and a destination, M≥2, L≥1, according to an orthogonal multiple access scheme of a transmission channel between and nodes taken from among the M sources and the L relays with a maximum number of $M+T_{max}$ time slots per transmitted frame including M slots allocated, during a first phase, to the successive transmission by the M sources, and at most $T_{max}$ slots for one or more cooperative transmissions allocated, during a second phase, to one or more of the nodes selected according to a selection strategy, $1 \leq T_{max}$, the nodes operating in half-duplex mode, wherein the transmitting comprises:
decoding, by at least one of the nodes, messages transmitted by the sources with detection of errors on the messages in order to determine a set of source messages correctly decoded by the at least one node, all the nodes which correctly decode source messages being called first nodes;
decoding, by the destination, messages from at least one second node of the nodes with detection of errors on the messages in order to determine a set of source messages correctly decoded by the destination; and for a time slot t of the second phase:
transmission, from the destination (D) to the nodes, of a control message indicating its set ($S_{D,t-1}$) of correctly decoded source messages,
determination, by at least one third node, of the first nodes, whether at least one message from the set of correctly decoded source messages by the at least one third node does not belong to the set of source messages correctly decoded by the destination,
transmission of binary information by the at least one third node to the destination (D) indicating a result of the determination, the binary information being conveyed by transmitting a binary indicator taking a first value when the determination by the at least one third node leads to the identification of at least one message, and otherwise taking a second, different value,
selection, by the destination (D), of one of the at least third node of the first nodes authorized to transmit during the transmission slot t.

6. The transmission method as claimed in claim 5, wherein at least one of the nodes performs a relaying function that implements joint network channel coding (JNCC) relaying.

7. The transmission method as claimed in claim 5, wherein at least one of the nodes performs a relaying function that implements distributed channel coding (DCC) relaying.

8. The transmission method as claimed in claim 5, wherein at least one of the nodes performs a relaying function that implements repetition relaying with a maximal ration combining (MRC) combination at the destination.

9. The transmission method as claimed in claim 5, wherein, in response to the set ($S_{D,t-1}$) of source messages correctly decoded by the destination indicated in the control message comprising all of the sources or if $t=T_{max}$, interrupting the second phase, and the nodes and the destination erasing any storage of the messages of the frame and a new frame is transmitted.

10. The transmission method as claimed in claim 5, wherein the node selection strategy corresponds, at each slot, to selection of the node from among the nodes said to be eligible nodes that have correctly decoded at least one source that the destination has not correctly decoded at the end of the previous time slot and that has a best instantaneous quality from among instantaneous qualities of links between these eligible nodes and the destination.

11. A system comprising:
M sources ($S_1, \ldots, S_M$), L relays ($R_1, \ldots, R_L$) and a destination (D), $M \geq 2$, $L \geq 1$, with an orthogonal multiple access scheme of a transmission channel between nodes taken from among the M sources and the L relays with a maximum number of $M+T_{max}$, $T_{max} \geq 1$, time slots per transmitted frame including M slots allocated, during a first phase, to the successive transmission by the M sources, and at most $T_{max}$ slots for one or more cooperative transmissions allocated, during a second phase, to one or more of the nodes selected according to a selection strategy,
wherein each of the nodes comprises:
a processor; and
a non-transitory computer-readable medium comprising instructions stored thereon which when executed by the processor configure the node to:
operate in half-duplex mode;
decode messages transmitted by the sources with detection of errors on the messages in order to determine a set of source messages correctly decoded by the node; and
for a time slot t of the second phase:
determine whether at least one message from the node's set of correctly decoded source messages does not belong to a set of source messages correctly decoded by the destination,
transmit binary information to the destination indicating a result of the determination, the binary information being conveyed by transmitting a binary indicator taking a first value when the determination by the node leads to the identification of at least one message, and otherwise taking a second, different value; and
wherein the destination comprises:
a processor; and
a non-transitory computer-readable medium comprising instructions stored thereon which when executed by the processor of the destination configure the destination to:
decode messages from a node, of the nodes, with detection of errors on the messages in order to determine the set of source messages correctly decoded by the destination;
transmit to the nodes the control message indicating the destination's set ($S_{D,t-1}$) of correctly decoded source messages; and
select one of the nodes authorized to transmit during the transmission slot t.

* * * * *